US011227431B1

(12) United States Patent
Weidlich

(10) Patent No.: US 11,227,431 B1
(45) Date of Patent: Jan. 18, 2022

(54) COMPUTING ILLUMINATION OF AN ELONGATED SHAPE HAVING A NONCIRCULAR CROSS SECTION

(71) Applicant: Weta Digital Ltd., Wellington (NZ)

(72) Inventor: Andrea Weidlich, Montreal (CA)

(73) Assignee: Weta Digital Ltd., Wellington (NZ)

( * ) Notice: Subject to any disclaimer, the term of this patent is extended or adjusted under 35 U.S.C. 154(b) by 0 days.

(21) Appl. No.: 17/377,126

(22) Filed: Jul. 15, 2021

Related U.S. Application Data

(60) Provisional application No. 63/221,708, filed on Jul. 14, 2021.

(51) Int. Cl.
*G06T 15/50* (2011.01)

(52) U.S. Cl.
CPC ........ *G06T 15/506* (2013.01); *G06T 2210/16* (2013.01)

(58) Field of Classification Search
CPC .............. G06T 15/506; G06T 2210/16; G06T 15/00–87
See application file for complete search history.

(56) References Cited

U.S. PATENT DOCUMENTS

| | | | | |
|---|---|---|---|---|
| 2013/0215139 A1* | 8/2013 | Xie | .......................... | G06T 15/50 345/595 |
| 2014/0204087 A1* | 7/2014 | Habel | ................... | G06T 15/506 345/426 |

OTHER PUBLICATIONS

Khungurn, Pramook, and Steve Marschner. "Azimuthal scattering from elliptical hair fibers." ACM Transactions on Graphics (TOG) 36.2 (2017): 1-23. (Year: 2017).*
D'Eon, Eugene, Steve Marschner, and Johannes Hanika. "Importance sampling for physically-based hair fiber models." SIGGRAPH Asia 2013 Technical Briefs. 2013. 1-4. (Year: 2013).*
Benamira, Alexis et al. "A combined scattering and diffraction model for elliptical hair rendering," Eurographics Symposium on Rendering 2021, vol. 40 (2021), No. 4, p. 163-175.

* cited by examiner

*Primary Examiner* — Daniel F Hajnik
(74) *Attorney, Agent, or Firm* — Perkins Coie LLP

(57) ABSTRACT

The system obtains an indication of a shape of a cross-section of an elongated shape, and an orientation of the shape. Based on the shape of the cross-section of the elongated shape and the orientation of the shape, the system creates a nonuniform distribution of random numbers mapping uniformly distributed input values to multiple points on the surface of the elongated shape. The system provides an input value randomly selected from a uniform distribution of random numbers to the nonuniform distribution of random numbers to obtain a point among the multiple sample points on the surface of the elongated shape. The system applies a function to the input value to obtain an indication of a normal associated with the sample point among the multiple sample points. Finally, the system computes an illumination of the elongated shape using the normal.

27 Claims, 14 Drawing Sheets

COMPUTING ILLUMINATION OF AN ELONGATED SHAPE HAVING A NONCIRCULAR CROSS SECTION

CROSS-REFERENCE TO RELATED APPLICATIONS

This application claims priority to the U.S. provisional patent application Ser. No. 63/221,708 filed Jul. 14, 2021 which is incorporated herein by reference in its entirety.

BACKGROUND

Traditional hair illumination models, such as the Marschner hair model, assume that the hair is a tube with a circular cross-section. The circular cross-section is not a physically accurate representation of a hair such as human or animal hair and consequently lacks certain observable visual qualities.

BRIEF DESCRIPTION OF THE DRAWINGS

Detailed descriptions of implementations of the present invention will be described and explained through the use of the accompanying drawings.

Figure 1A:
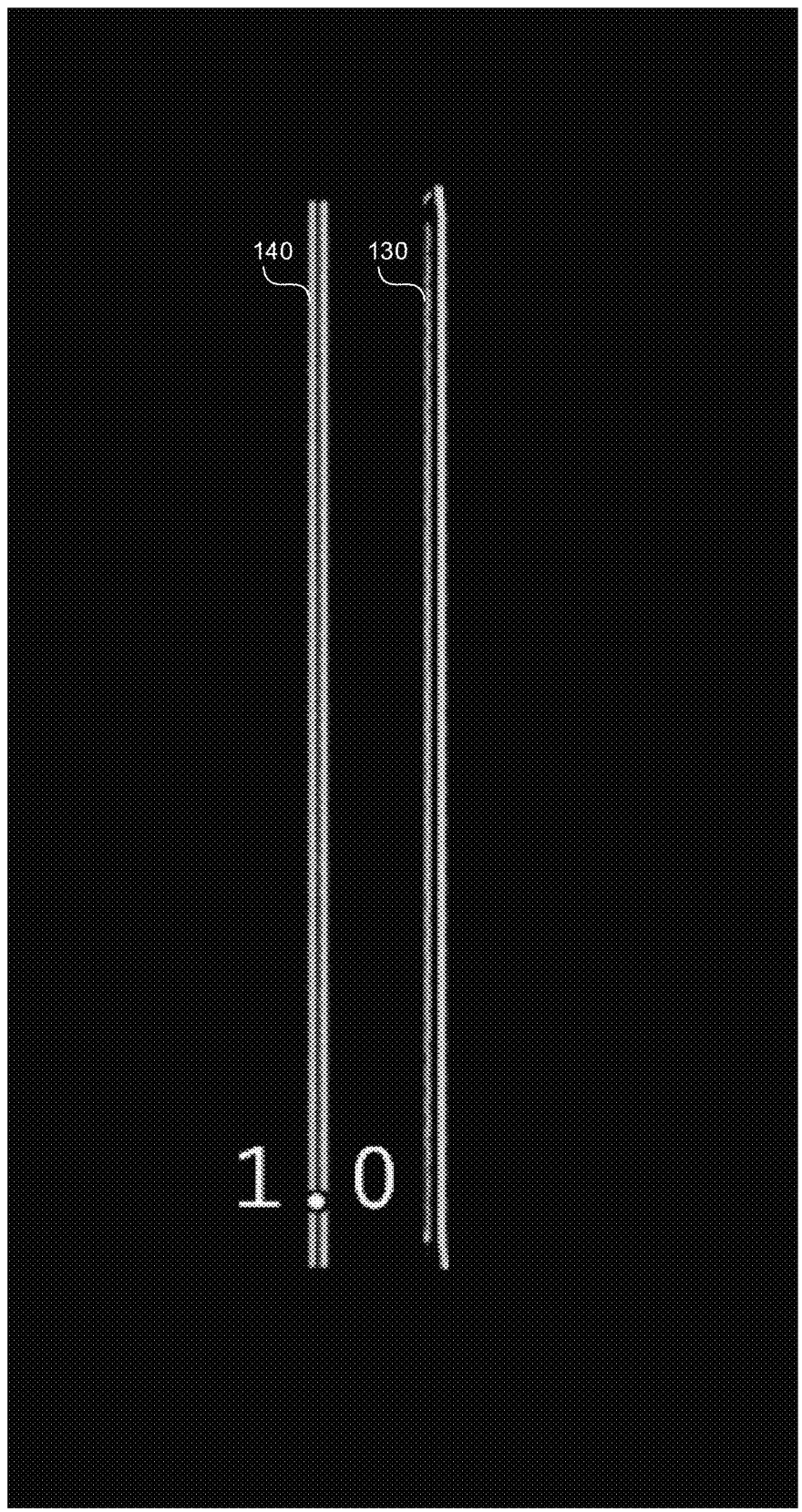
FIGS. 1A-1B show illumination of a fiber having a circular and an elliptical cross-section.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In 3D computer graphics, illumination calculations involve reflecting light coming into a point P around a normal N at the point P. Calculating illumination of a fiber, such as a hair, is difficult because the fiber can be represented as an infinitely thin line, and any one point on the fiber can have infinitely many normals contained in a plane perpendicular to the direction of the fiber at point P. Further, the shape of the cross-section of the fiber influences the visual appearance of the fiber. For example, when the fiber has a circular cross-section, glints, or flashes of light, are not visible because the curvature of the cross-section varies smoothly. However, when the fiber has a noncircular cross-section, such as an elliptical cross-section, glints become part of the visual appearance of the fiber. Human hair has an elliptical cross-section, and modeling human hair using a fiber with an elliptical cross-section produces a desirable visual appearance.

Disclosed here is a system and method to calculate illumination of a fiber having a noncircular cross-section by representing normals of the fiber having the noncircular cross-section using a nonuniform distribution of random numbers. System can use a nonuniform distribution of random numbers to map uniformly distributed input values to points on the surface of the fiber while calculating the normals of the points on the surface of the fiber using an analytic function of the input values. The calculations can be used in computer graphics and animation for the generation of an image or animation including the fiber.

The noncircular cross-section can be an ellipse. The nonuniform distribution of random numbers maps uniformly distributed input values to multiple points on the elliptical cross-section of the fiber. The system can obtain the shape of the ellipse by obtaining the ratio between the major and minor axis of the ellipse, and orientation of the ellipse. Based on the shape and the orientation of the ellipse, the system can create the nonuniform distribution of random numbers. The nonuniform distribution of random numbers is such that the arcsine of the input value to the uniform distribution of random numbers ("uniform distribution") produces an angle of a normal of the point on the surface of the fiber, where the point on the surface of the fiber is computed based on the output of the nonuniform distribution of random numbers. Based on the normal, the system can compute the illumination of the fiber. Using the analytic function and the distribution to compute the normal of the noncircular cross-section increases the speed of the illumination computation considerably more than by a factor of ten.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Computing Illumination of an Elongated Shape Having a Noncircular Cross Section

Figure 1B:
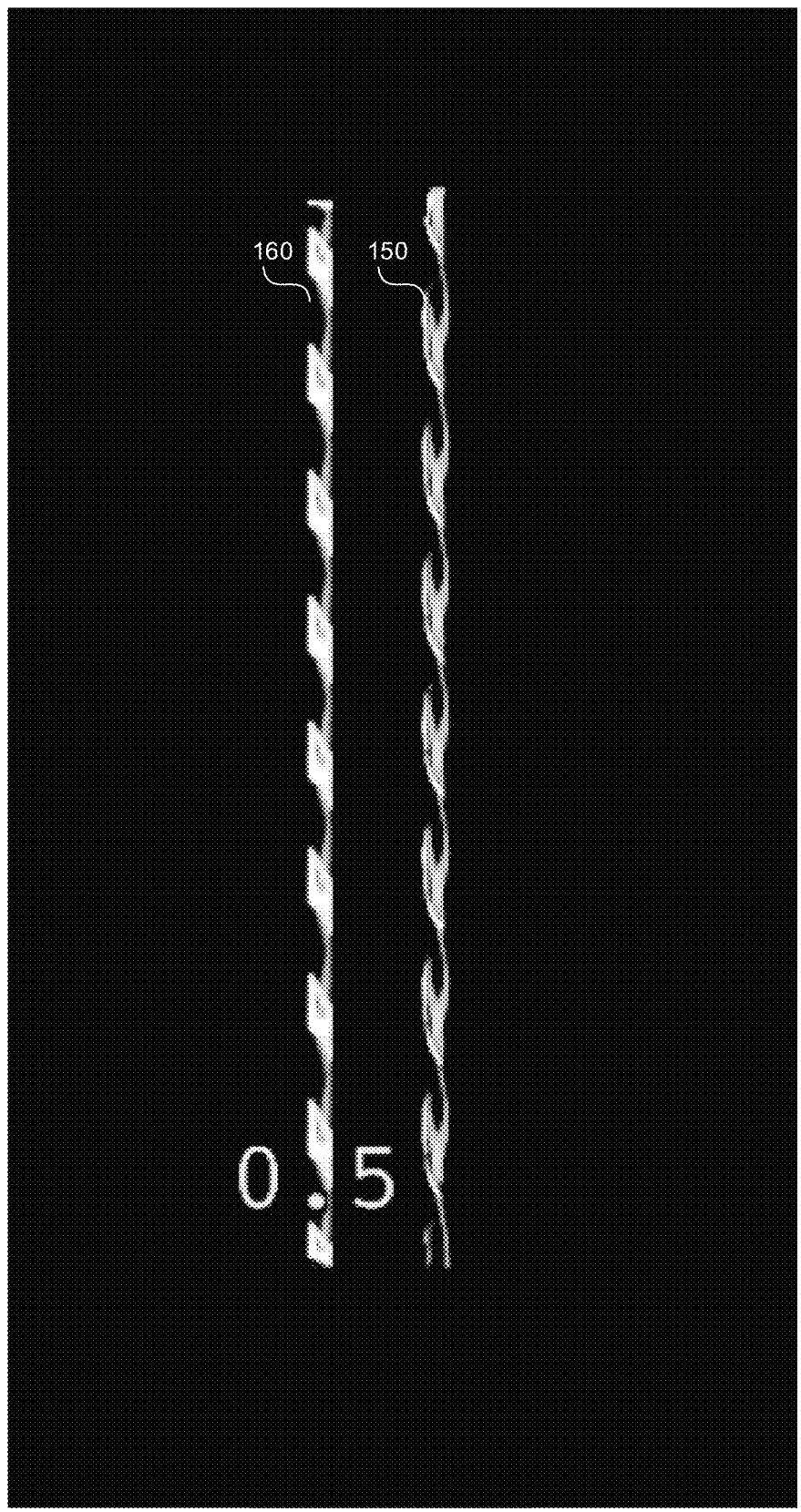

FIGS. 1A-1B show illumination of a fiber having a circular and an elliptical cross-section. In FIG. 1A, fiber 130 shows the ground truth, namely an illumination of a fiber represented using geometry having a circular cross-section that has been twisted while keeping the bottom of the fiber fixed in space. In FIG. 1A, fiber 140 shows a computer graphics (CG) rendering, i.e. an approximation, of an illumination of a fiber having a circular cross-section that has been twisted while keeping the bottom of the fiber fixed in space. In FIG. 1B, fiber 150 shows the ground truth, namely illumination of a fiber represented using geometry having an elliptical cross-section that has been twisted while keeping the bottom of the fiber fixed in space. In FIG. 1B, fiber 160 shows a CG rendering, i.e. an approximation, of an illumination of a fiber having an elliptical cross-section that has been twisted while keeping the bottom of the fiber fixed in space. When the fiber has an elliptical cross-section, twisting of the fiber produces significant illumination effects as can be seen with fiber 150. If the fiber having an elliptical cross-section is represented using a fiber with a circular cross-section, twisting of the fiber would produce a render shown with fiber 140, which is quite different from the desired illumination shown with fiber 150. Therefore, representing hair with an elliptical cross-section using a fiber having an elliptical cross-section can produce more realistic illumination in CG rendering.

Figure 1C:
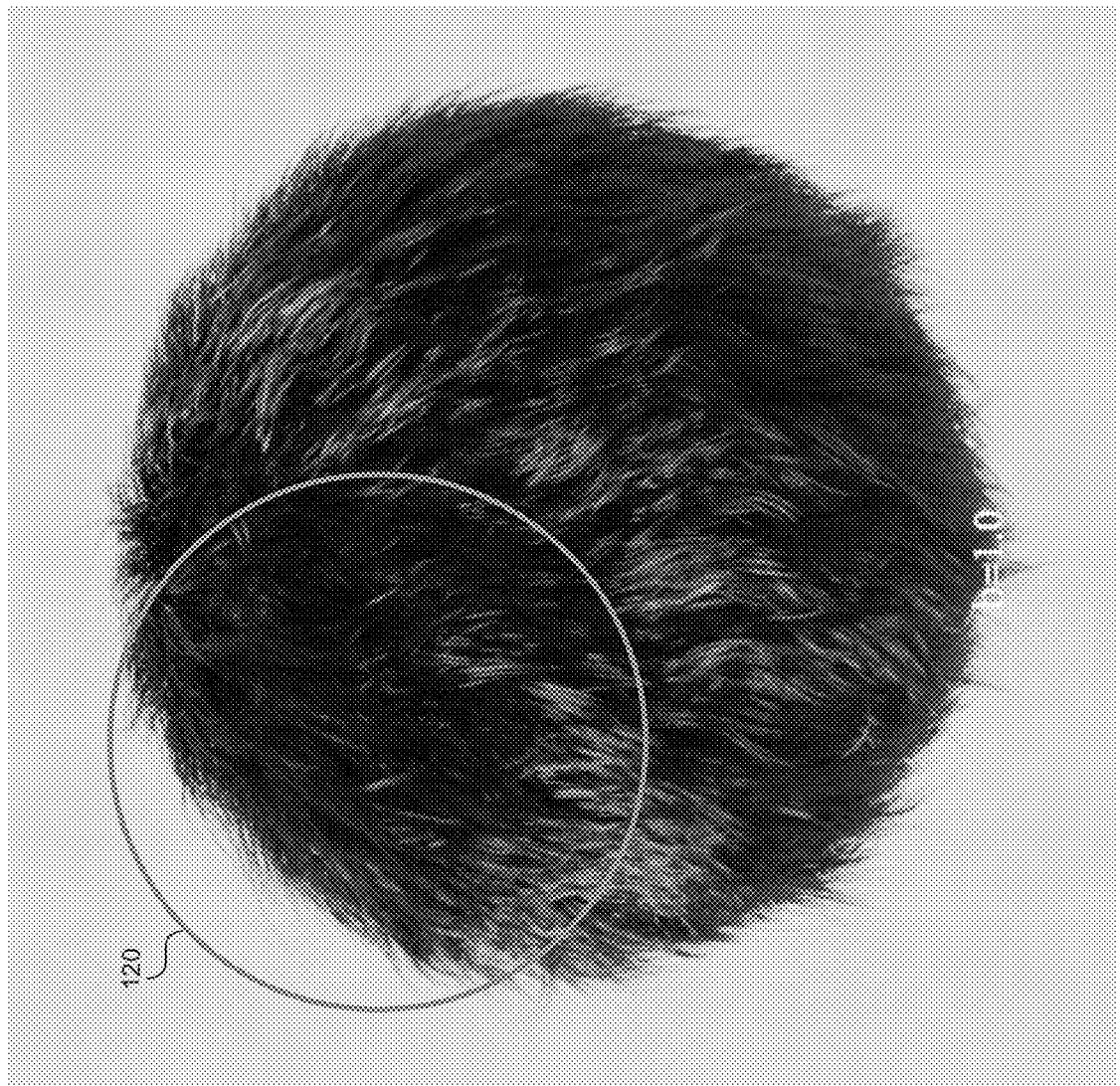
FIGS. 1C-1D show a hair illumination of a hair having a circular cross-section and an elliptical cross-section.
Figure 1D:
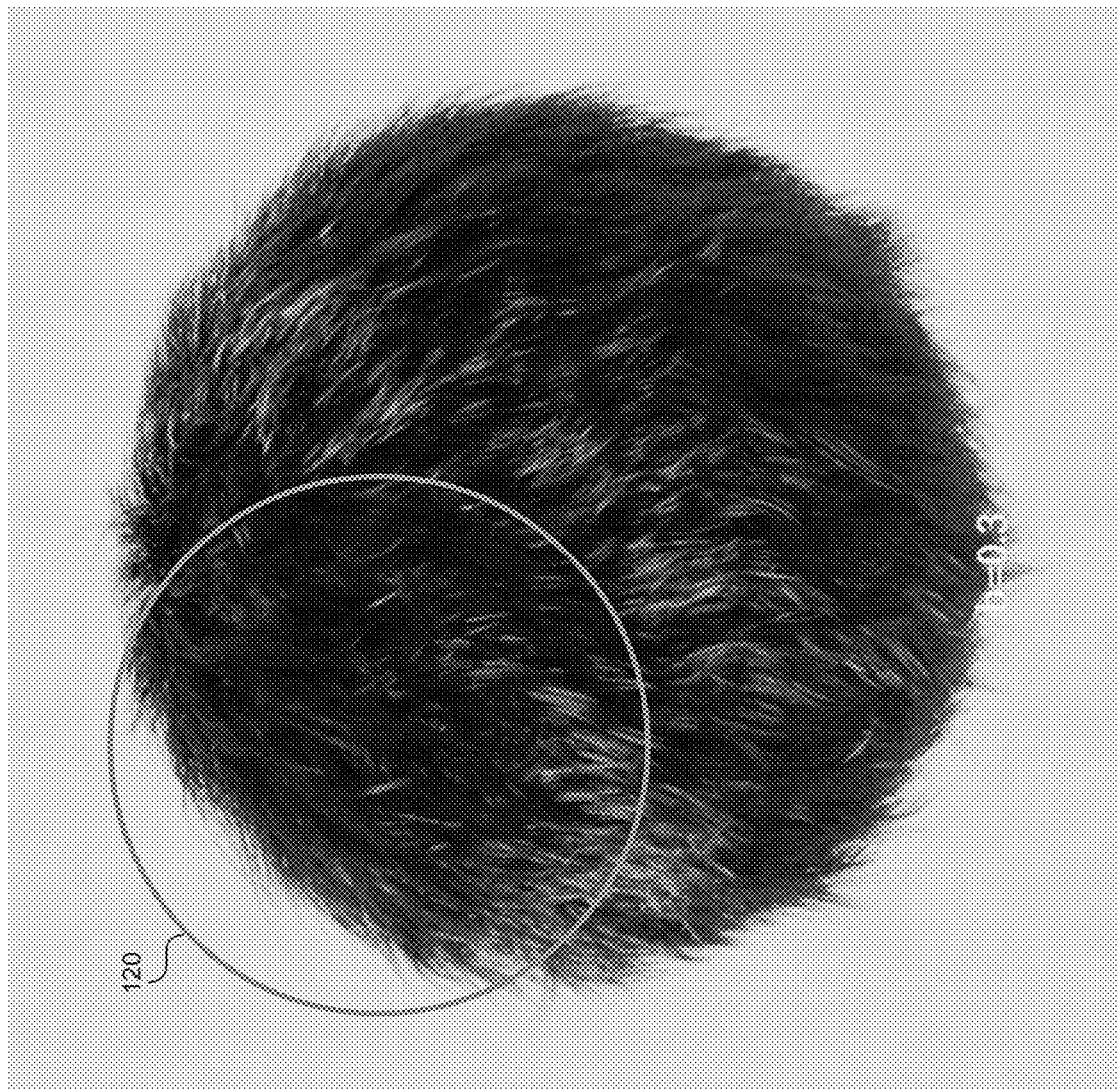

FIGS. 1C-1D show a hair illumination of a hair having a circular cross-section and an elliptical cross-section. In image 100 in FIG. 1C, the hair has a circular cross-section, while in the image 110 in FIG. 1D, the hair has an elliptical cross-section. The aspect ratio of the ellipse is 0.3. As can be seen by comparing images 100 and 110, the detail in the hair is more apparent in image 110. For example, the details of the hair structure are more visible in the region 120 in image 110 than in the image 100.

Figure 2:
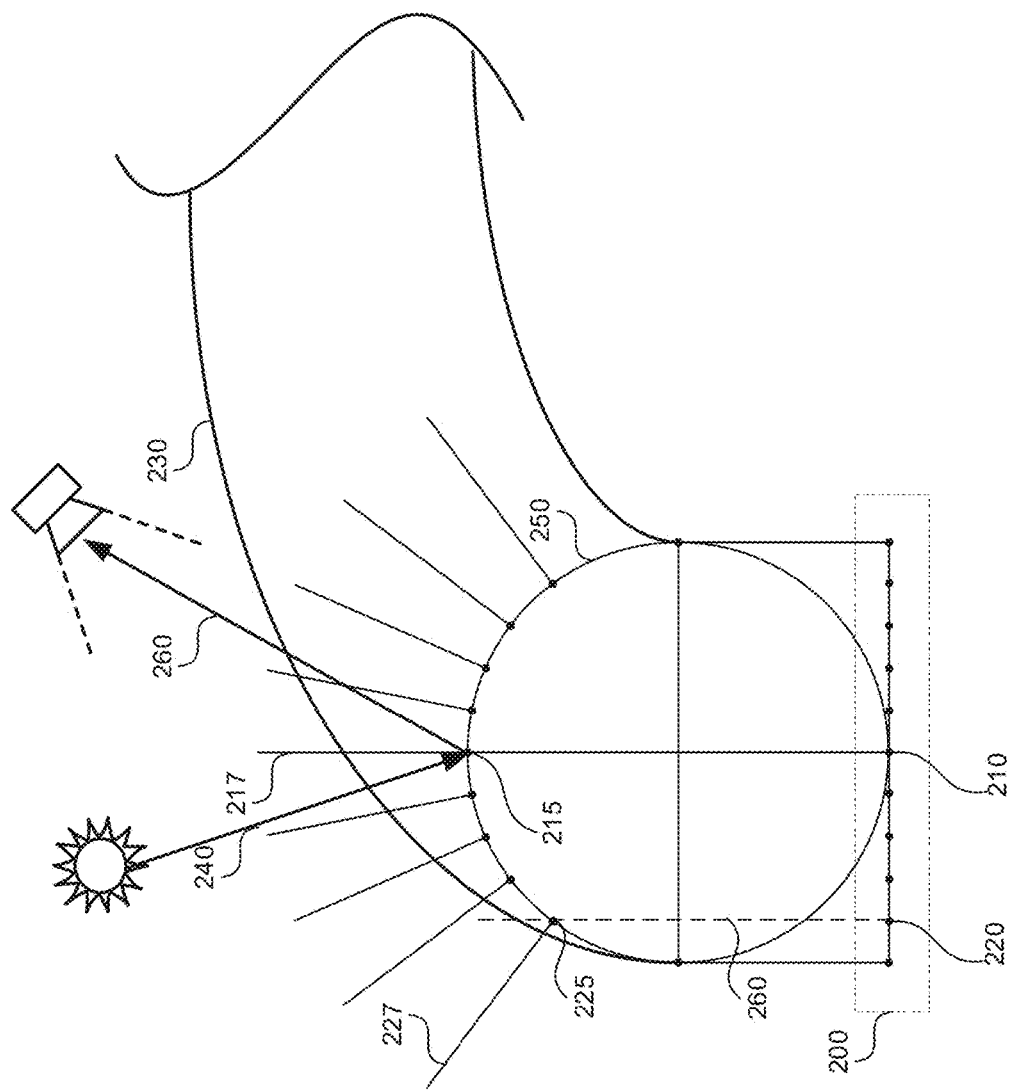
FIG. 2 shows multiple sample points and multiple corresponding normals of a fiber having a circular cross-section.

FIG. 2 shows multiple sample points and multiple corresponding normals of a fiber having a circular cross-section. The multiple sample points 210, 220 (only two labeled for brevity) are selected from a uniform distribution of random numbers 200 varying between a predetermined range, such as −1 to 1. Each sample point 210, 220 has a corresponding point 215, 225, respectively, on the surface of the fiber 230 having a circular cross-section 250. A hardware or software processor executing instructions described in this application can calculate the corresponding points 215, 225 by projecting the sample points 210, 220 along a vertical direction 270, until the top part of the circular cross-section 250 is reached. Each point 215, 225 (only two labeled for brevity) on the surface of the fiber 230 has a corresponding normal 217, 227, respectively.

Once a point 215, 225 from the uniform distribution of random numbers 200 is selected, the processor can quickly calculate the corresponding normal 217, 227. To calculate the angle to the normal, the processor can compute inverse sin (i.e., arcsine) of the point 215, 225. For example, when the point is equal to −1, arcsine of the point produces −90°. When the point is equal to 0, arcsine produces 0°, and when the point is equal to 1, arcsine produces 90°.

To calculate the illumination of the fiber 230, the processor can calculate an illumination provided by the incoming ray of light 240 at the point 225 based on the direction of the incoming ray of light 240, the normal 217, and the viewing direction 260 of the observer.

Figure 3:
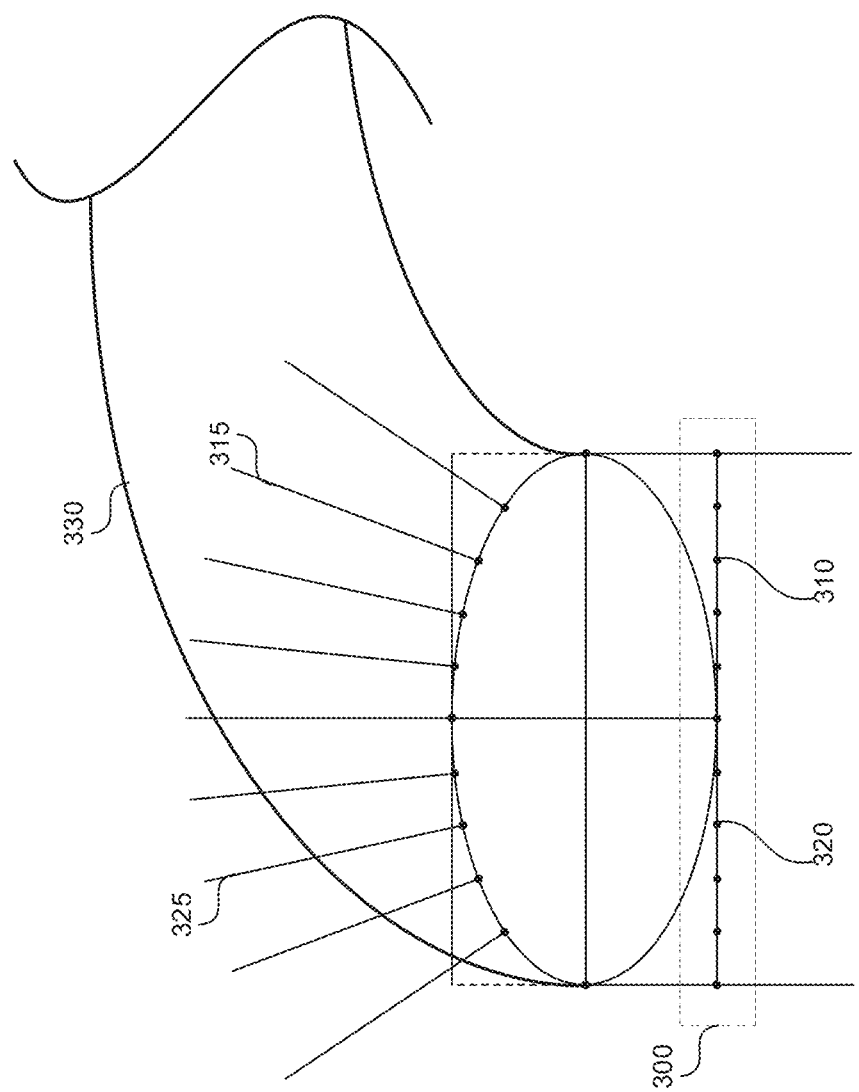
FIG. 3 shows multiple sample points and multiple corresponding normals of a fiber having an elliptical cross-section.

FIG. 3 shows multiple sample points and multiple corresponding normals of a fiber having an elliptical cross-section. The multiple sample points 310, 320 (only two labeled for brevity) are selected from a uniform distribution of random numbers 300 varying between a predetermined range, such as −1 to 1. However, the correspondence between the sample points and their corresponding normals 315, 325 is not calculated with arcsine as in the case of a circular cross-section explained in FIG. 2 and cannot be easily represented in an analytic form. While the corresponding normals 315, 325 can be calculated, using an analytic function to calculate the normals 315, 325 increases the speed of the computation by considerably more than 10 times. To model a fiber 330 having an elliptical cross-section, where an analytic function can map between the sample points 310, 320 and their corresponding normals 315, 325, a different distribution is needed.

Figure 4A:
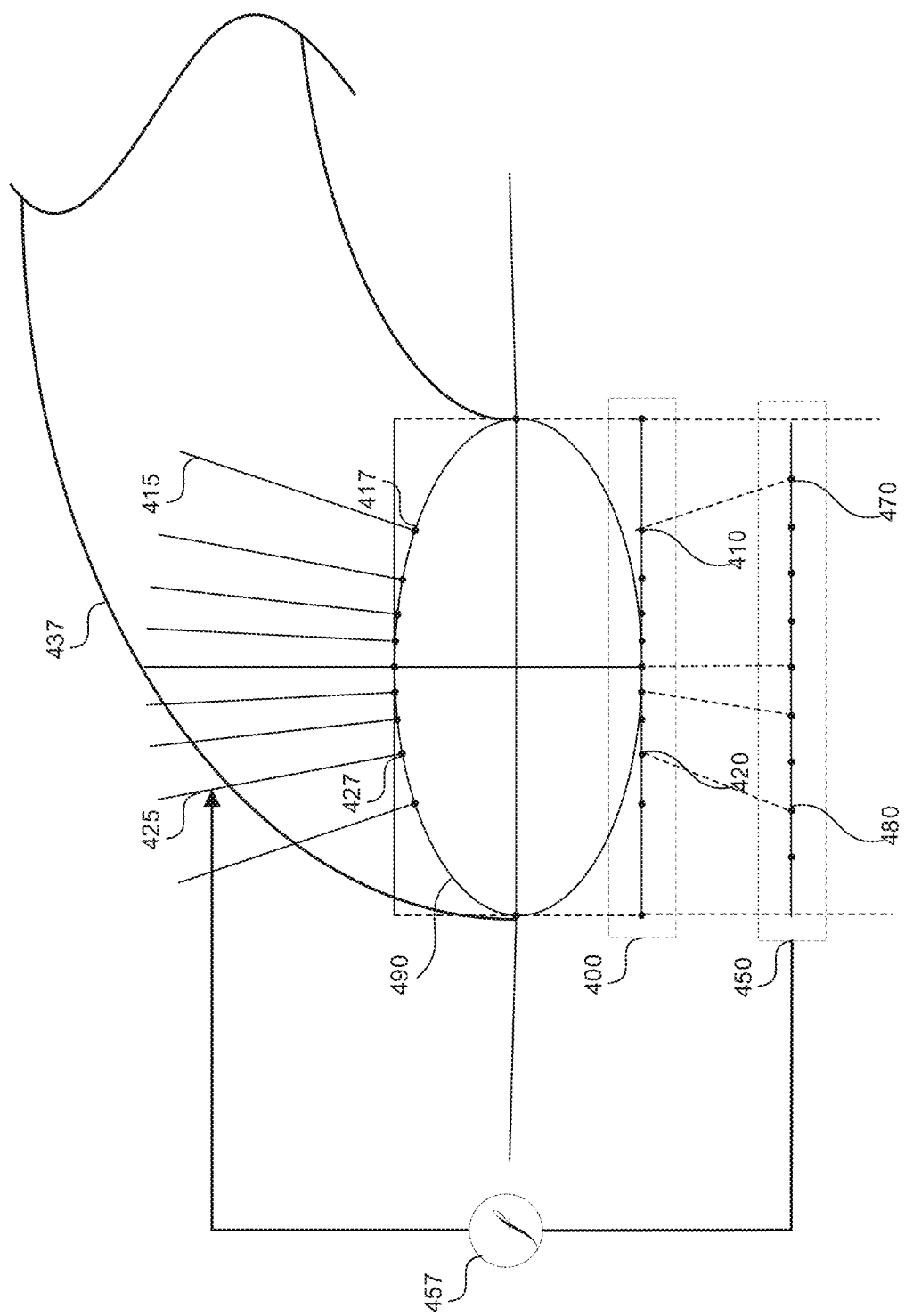
FIGS. 4A-4B show multiple sample points and multiple corresponding normals of the hair fiber having an elliptical cross-section, with a nonuniform distribution of random numbers.
Figure 4B:
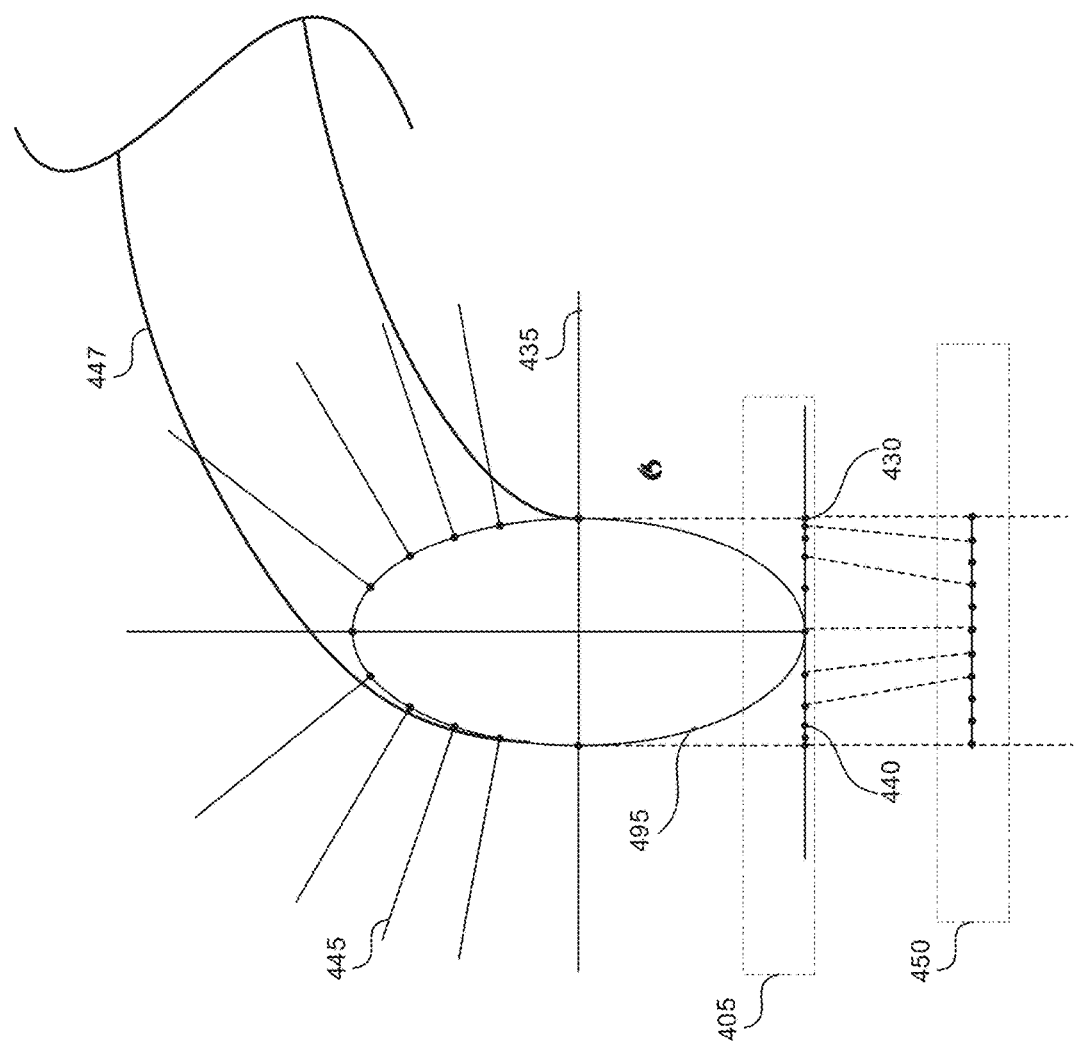

FIGS. 4A-4B show multiple sample points and multiple corresponding normals of the hair fiber having elliptical cross-section, with a nonuniform distribution of random numbers ("nonuniform distribution"). The multiple sample points 410, 420, 430, 440 (only two labeled for brevity in each figure) are selected from a nonuniform distribution 400, 405. As can be seen in FIG. 4A, the nonuniform distribution 400 has a higher density of points toward the middle of the range, such as 0. As can be seen in FIG. 4B, the nonuniform distribution 405 has a higher density of the points toward the ends of the range such as −1 and 1. The sample points 410, 420, 430, 440 are associated with normals 415, 425, 435, 445, respectively.

To calculate a normal 415, 425, 435, 445, the processor takes in a uniform distribution 450, 460 as input values and maps the uniformly distributed input values 470, 480 to the multiple sample points 410, 420, respectively. To calculate the normal 415, 425, the processor can use the input values 470, 480, instead of the sample points 410, 420. Specifically, the processor can use the input values 470, 480 as inputs to an analytic function 457, such as arcsine, as described in FIG. 2 above, to obtain an angle of the normal 415, 425. Even though the normals 415, 425 are surface normals at the points 417, 427 on the surface of the fiber 437, and the points 417, 427 are projections of the sample points 410, 420 to the surface of the fiber 437, neither the points 417, 427 nor the sample points 410, 420 are used to calculate the normals 415, 425. Instead, the input values 470, 480, which come from a uniform distribution 450, are used as inputs into the analytic function 457. The reason is that the use of the analytic function 457 to map between the input values 470, 480 and the angle of the normal 415, 425 speeds up the calculation of the normals 415, 425, as opposed to calculating the normals based on the surface points 417, 427 or the sample points 410, 420. The speed-up can be considerably more than 10 times. Once the processor obtains the normal 415, 425 of the fiber 447, 437, the processor can calculate the illumination of the fiber at points 417, 427.

In effect, the shape of the cross-section 490, 495 of the fiber 437, 447 is represented using the distribution 400, 405. The shape of the cross-section 490, 495 can take on any curvilinear shape, such as an ellipse, a lemniscate (e.g., shape of the infinity symbol), a star-shape, etc.

As can be seen in FIGS. 4A, 4B, when the orientation of the noncircular cross-section 490, 495 changes, the distribution 400, 405 changes. To determine the appropriate distribution 400, 405, the processor can obtain an indication of a noncircular shape of the cross-section of the fiber and an orientation of the shape. When the cross-section 490, 495 is an ellipse, the indication of the noncircular shape can contain the aspect ratio of the ellipse, such as the ratio of the major and minor axis. Based on the shape of the cross-section of the fiber and the orientation of the shape, the processor can create the distribution 400, 405 of multiple sample points representing the noncircular shape of the cross-section of the fiber.

To create a distribution 400, 405, the processor can retrieve a lookup table correlating the indication of the noncircular shape and the orientation to parameters of the distribution 400, 405. As explained in this application, the distribution 400, 405 representing the elliptical cross-section 490, 495 can be the Beta distribution or the Kumaraswamy distribution.

Figure 5A:
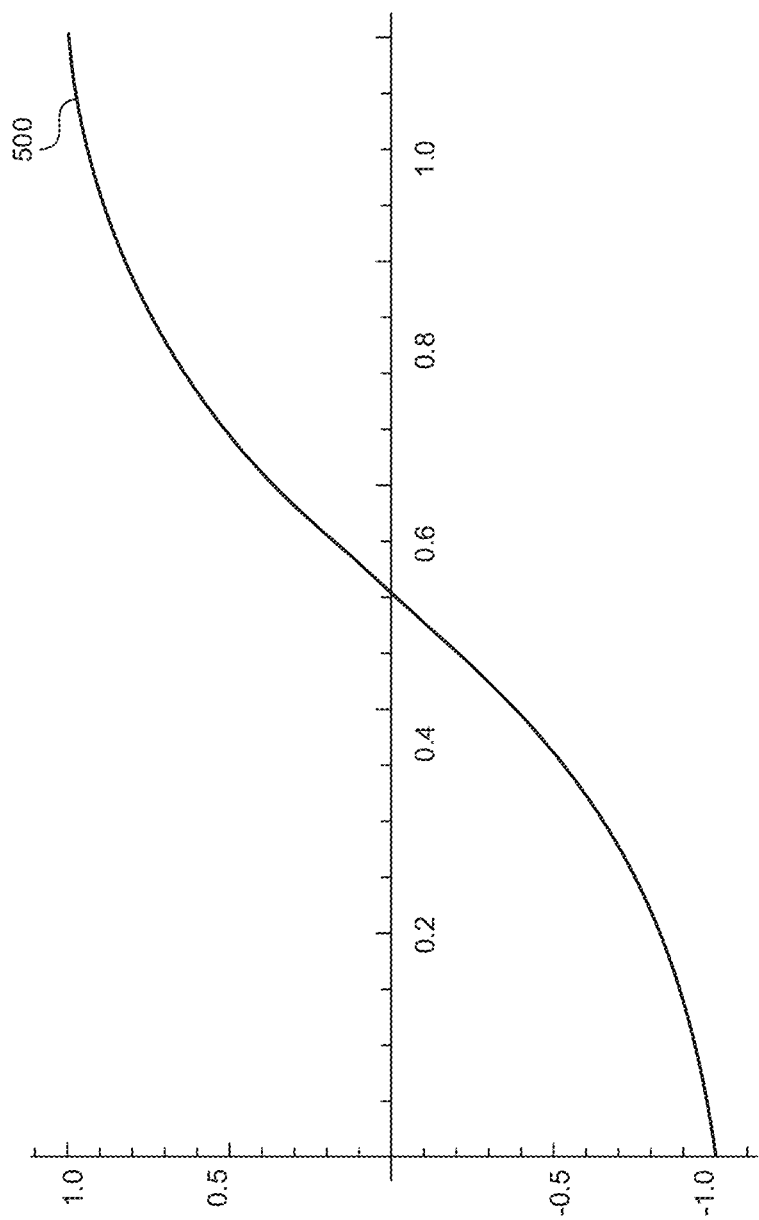
FIGS. 5A-5C show a distribution of normals on an ellipse, and two approximations of the distribution of normals, respectively.
Figure 5B:
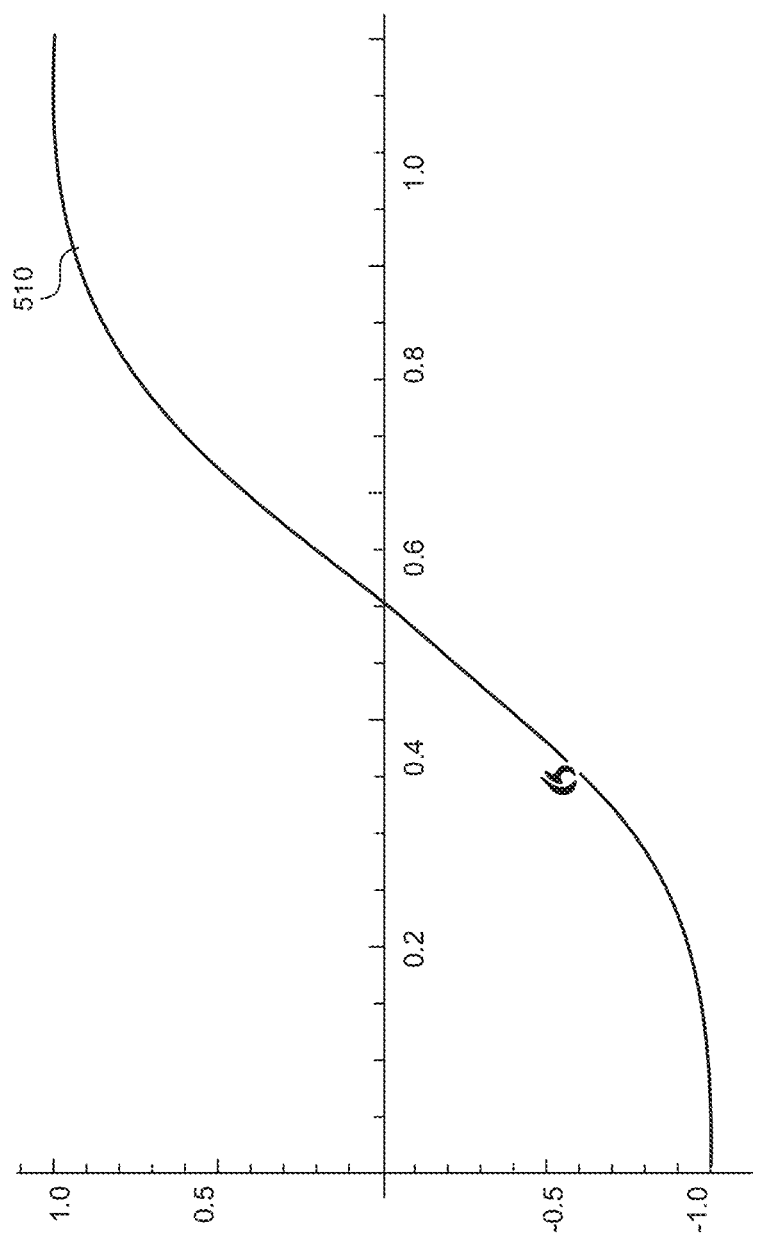
Figure 5C:
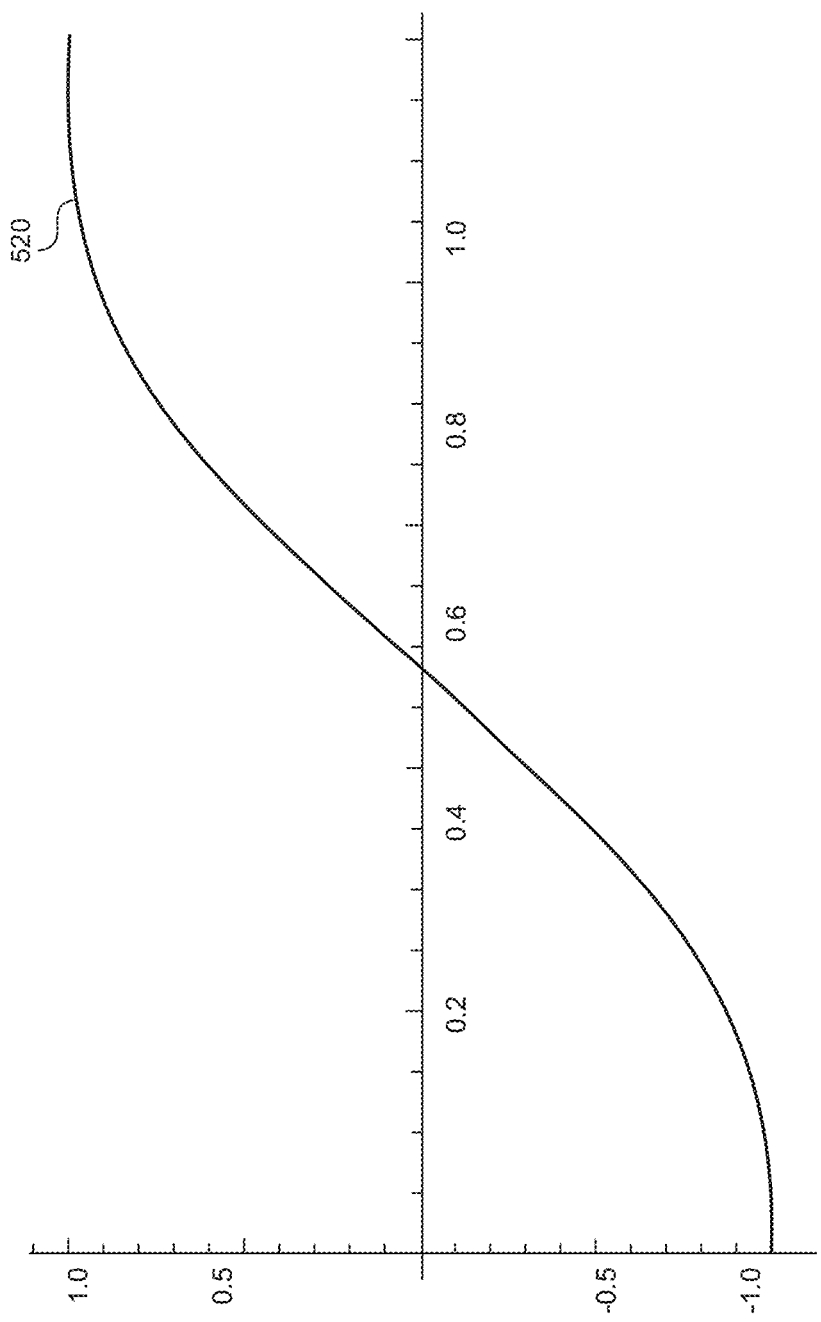

FIGS. 5A-5C show a distribution of normals on an ellipse, and two approximations of the distribution of normals, respectively. Distribution 500 shows a distribution of normals on an ellipse. The distribution 510 is a cumulative distribution function (CDF) of the Beta distribution 510, which is an approximation of the distribution 500. The distribution 510 can be represented by:

CDF((BetaDistribution(4, 4), x)*2−1, {x, 0,1}).

The CDF of a real-valued random variable x, or just distribution function of x, evaluated at A, is the probability that x will take a value less than or equal to A. The Beta distribution, however, is computationally expensive to compute. Instead, the Kumaraswamy probability distribution function can be used to approximate the Beta distribution 510. As opposed to the Beta distribution, the Kumaraswamy distribution is computationally faster to evaluate by over 100 times compared to the Beta distribution. The distribution 520 is a CDF of the Kumaraswamy distribution, which is an approximation of the distribution 510. The CDF of Kumaraswamy distribution 520 can be represented by CDF((KumaraswamyDistribution(2.5, 4), x)*2−1, {x, 0,1}).

Further, while both the Beta distribution and the corresponding distribution can be inverted, the CDF Kumaraswamy distribution 520 can be inverted in a computationally efficient manner. Both the Beta distribution and the Kumaraswamy distribution are probability distribution functions (PDF). The PDF of x represents the probability that x is selected.

Based on the CDF 510, 520, the processor can derive the multiple sampling points and the sampling algorithm by inverting the CDF. Given a viewing direction 260 in FIG. 2, the processor can use the PDF to determine what normals contribute to illumination in the viewing direction 260. Further, the processor can use the inverted CDF to sample a new direction based on a given probability distribution.

Figure 6:
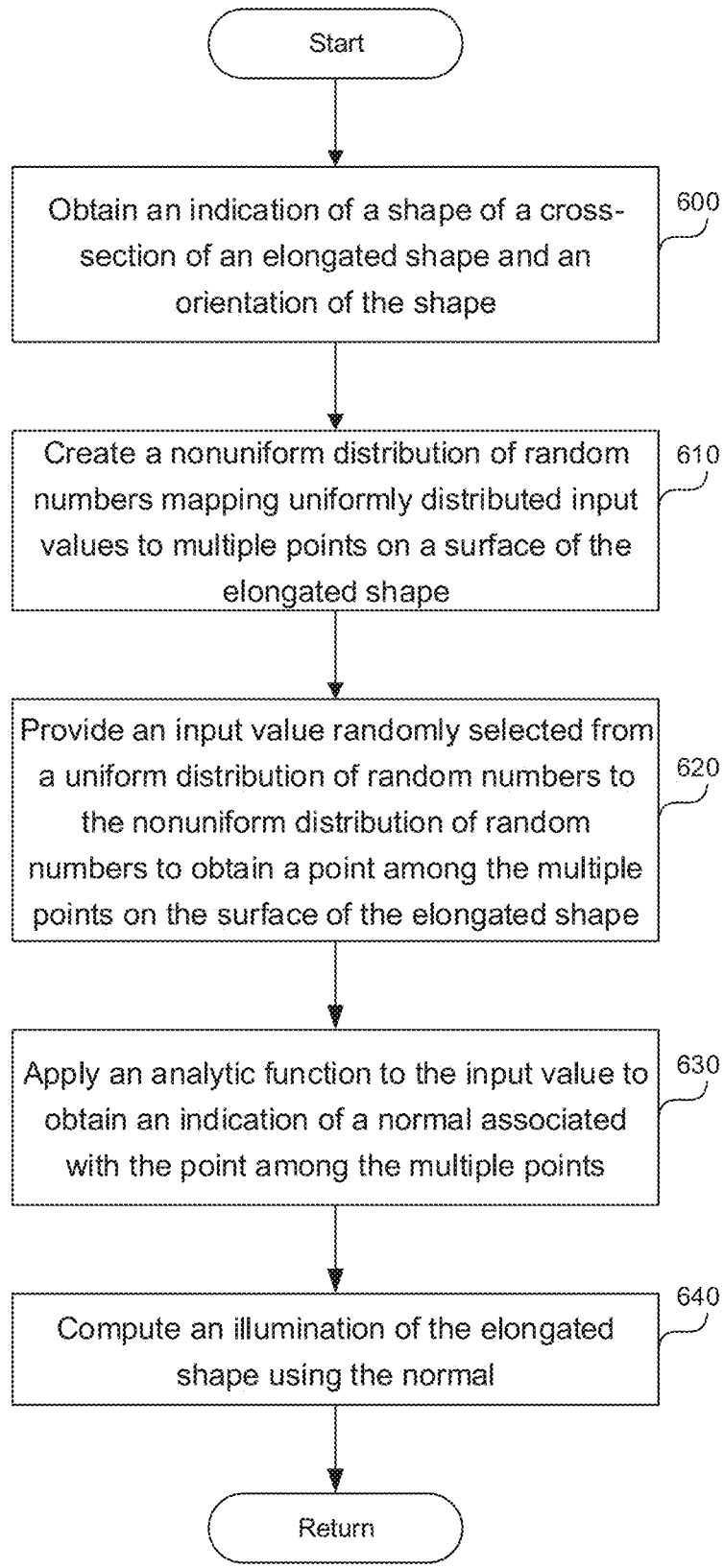
FIG. 6 is a flowchart of a method to calculate illumination of an elongated shape having a noncircular cross-section.

FIG. 6 is a flowchart of a method to calculate illumination of an elongated shape having a noncircular cross-section. The elongated shape can be a fiber, such as human hair, animal hair, carpet fiber, etc., as described in this application. A hardware or a software processor executing instructions describing this application can represent the elongated shape with the noncircular cross-section using a nonuniform distribution of random numbers mapping uniformly distributed input values to multiple sample points 210, 220 in FIG. 2; 310, 320 in FIG. 3; corresponding to multiple points 215, 225 in FIG. 2 on the noncircular cross-section of the elongated shape. Further, to represent the elongated shape, the processor can apply an analytic function to an input value of the nonuniform distribution to obtain a normal describing the shape. Therefore, the elongated shape can be represented using a nonuniform distribution and a select analytic function without geometrically representing the elongated shape, such as by using points, edges, and surfaces.

In step 600, the processor can obtain an indication of a shape of the noncircular cross-section of the elongated shape, and an orientation of the shape. The elongated shape can be a curvilinear shape such as an ellipse, a lemniscate (e.g., shape corresponding to the infinity sign), a rectangle, etc. The indication of the shape can include points, edges, and surfaces, and it can include a formula representing the shape. For example, if the noncircular cross-section is an ellipse, the indication of the shape can be an aspect ratio of the minor to major axis of the ellipse.

In step 610, based on the shape of the noncircular cross-section of the elongated shape and the orientation of the shape, the processor can create the nonuniform distribution of random numbers representing the shape of the noncircular cross-section of the elongated shape. The nonuniform distribution can be the Beta distribution, the Kumaraswamy distribution, or some other distribution approximating the Beta distribution. For example, the processor can access a lookup table storing a representation of the shape of the noncircular cross-section and corresponding parameters of the nonuniform distribution. Based on the lookup table, the processor can retrieve the parameters of the nonuniform distribution that correspond to the particular noncircular cross-section of the elongated shape. The nonuniform distribution is such that the arcsine of the input value to the nonuniform distribution produces an angle of a normal of the point on the surface of the fiber. For example, in FIG. 4A, the input value can be the value 480, selected from the uniform distribution 450. The nonuniform distribution 400 takes the input value 480 and produces a sample point 420. The processor can project the sample point 420 onto the surface of the noncircular cross-section to obtain the point 427. The arcsine of the input value 480 provides an indication of the surface normal 425 at the surface point 427.

In step 620, as explained above, the processor can provide an input value 480 randomly selected from a uniform distribution 450 to the nonuniform distribution 400 to obtain a sample point 420 among the multiple sample points. The sample point 420 corresponds to the point 427 on the surface of the elongated shape 437.

In step 630, the processor can apply an analytic function, such as arcsine, to the input value 480 to obtain an indication of a normal 425 associated with the sample point 427 among the multiple sample points. In step 640, the processor can compute the illumination of the elongated shape using the normal.

When the shape of the noncircular cross-section is elliptical, the processor can use a distribution approximating the Beta distribution to represent the geometry of the elongated shape. The distribution approximating the Beta distribution can be the Kumaraswamy distribution. Specifically, the processor can obtain an aspect ratio of the elliptical cross-section and the orientation of the elliptical cross-section. Based on the aspect ratio of the elliptical cross-section and the orientation of the elliptical cross-section, the processor can determine a parameter of the distribution approximating the Beta distribution representing the elliptical cross-section of the elongated shape. The processor can provide the input value randomly selected from the uniform distribution of random numbers to the distribution approximating the Beta distribution to obtain a sample point used in calculation of the normal. As explained above, the processor can retrieve from a lookup table the parameter of the Kumaraswamy distribution based on the aspect ratio of the elliptical cross-section and the orientation of the elliptical cross-section.

The processor can model the noncircular cross-section of the elongated shape using the nonuniform distribution that is computationally efficient to evaluate. The processor can obtain a second nonuniform distribution of random numbers approximating the nonuniform distribution of random numbers, where the second nonuniform distribution of random numbers is more computationally efficient than the nonuniform distribution of random numbers. The processor can use the second nonuniform distribution of random numbers to calculate the normal of the elongated shape. For example, the second nonuniform distribution can be the corresponding distribution, while the more computationally expensive nonuniform distribution can be the Beta distribution. The second nonuniform distribution can be faster to evaluate and/or can use less memory than the Beta distribution.

The processor can apply the disclosed technology to illuminate multiple elongated shapes, such as multiple elongated shapes that are woven together. For example, a single carpet fiber can include multiple tubular shapes that are twisted or woven together. The various tubular shapes can have different cross-sections. The processor can calculate the illumination of the single carpet fiber by obtaining a geometric object including multiple elongated shapes, such as a geometric representation of the carpet fiber. The processor can calculate illumination of the geometric object by calculating illumination of each elongated shape among the multiple elongated shapes using a nonuniform distribution of random numbers corresponding to a cross-section of each elongated shape.

Visual Content Generation System

Figure 7:
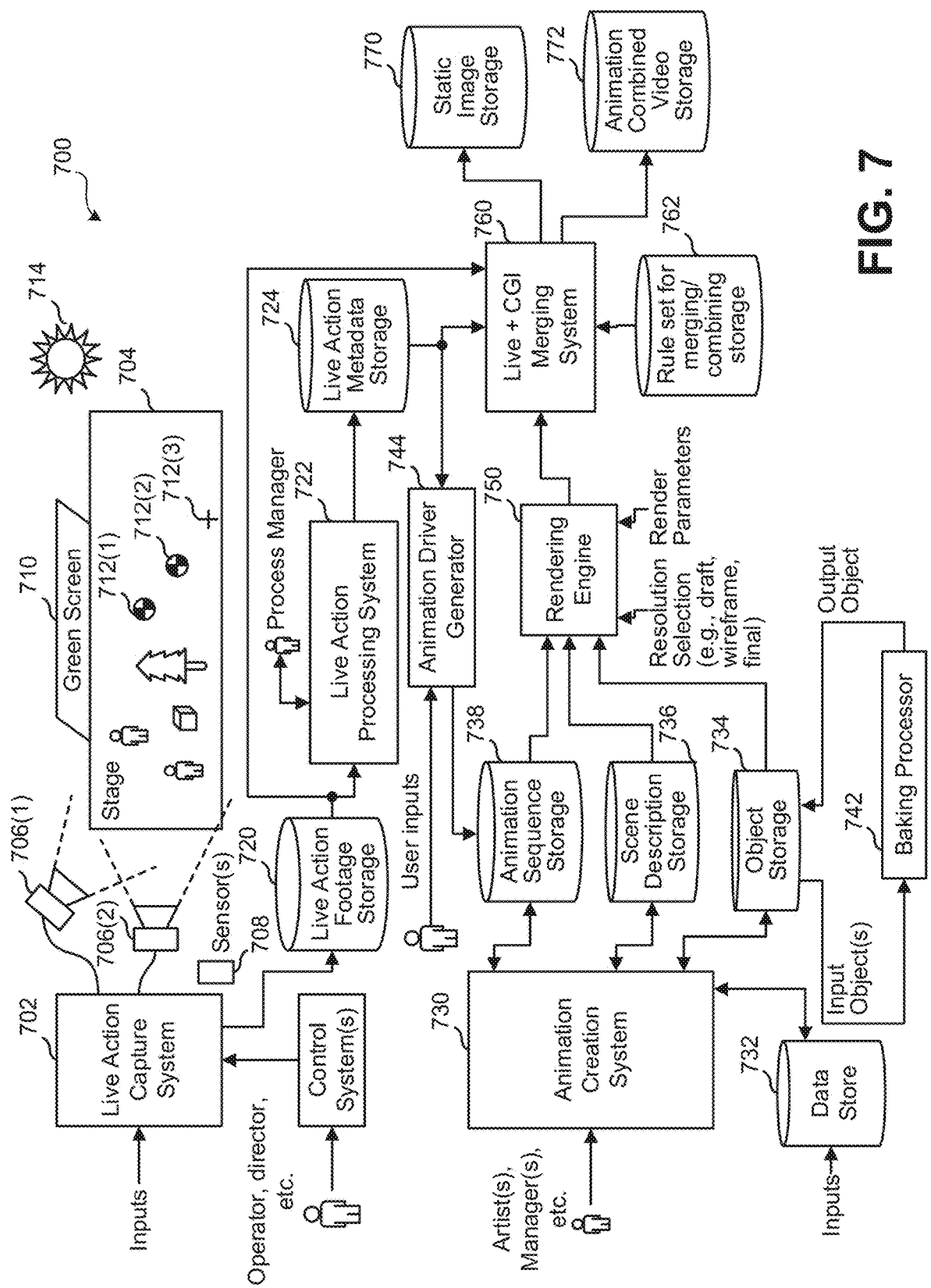
FIG. 7 illustrates an example visual content generation system 700 as might be used to generate imagery in the form of still images and/or video sequences of images.

FIG. 7 illustrates an example visual content generation system 700 as might be used to generate imagery in the form of still images and/or video sequences of images including fibers with the calculated illumination as described above. Visual content generation system 700 might generate imagery of live action scenes, computer-generated scenes, or a combination thereof. In a practical system, users are provided with tools that allow them to specify, at high levels and low levels where necessary, what is to go into that imagery. For example, a user might be an animation artist and might use visual content generation system 700 to (1) capture interaction between two human actors performing live on a sound stage, (2) replace one of the human actors with a computer-generated anthropomorphic non-human being that behaves in ways that mimic the replaced human actor's movements and mannerisms, and then (3) add in a third computer-generated character and background scene elements that are computer-generated, all in order to tell a desired story or generate desired imagery.

Still images that are output by visual content generation system 700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures, and a pixel value can be associated with a pixel and can be a scalar value, a vector, or another data structure associated with a corresponding pixel. That pixel value might include color values, or not, and might include depth values, alpha values, weight values, object identifiers, or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene (i.e., events that physically occur and can be recorded by a video camera). The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than by capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing, wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated; and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 7, a live action capture system 702 captures a live scene that plays out on a stage 704. Live action capture system 702 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 706(1) and 706(2) capture the scene, while in some systems, there might be other sensor(s) 708 that capture information from the live scene (e.g., infrared cameras, infrared sensors, motion capture ("mo-cap") detectors, etc.). On stage 704, there might be human actors, animal actors, inanimate objects, background objects, and possibly an object such as a green screen 710 that is designed to be captured in a live scene recording in such a way that it is easily overlaid with computer-generated imagery. Stage 704 might also contain objects that serve as fiducials, such as fiducials 712(1)-(3), that might be used post-capture to determine where an object was during capture. A live action scene might be illuminated by one or more lights, such as an overhead light 714.

During or following the capture of a live action scene, live action capture system 702 might output live action footage to a live action footage storage 720. A live action processing system 722 might process live action footage to generate data about that live action footage and store that data into a live action metadata storage 724. Live action processing system 722 might include computer processing capabilities, image processing capabilities, one or more processors, program code storage for storing program instructions executable by the one or more processors, as well as user input devices and user output devices, not all of which are shown. Live action processing system 722 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 714, as that might be useful in post-processing to match computer-generated lighting on objects that are computer-generated and overlaid on the live action footage. Live action processing system 722 might operate autonomously, perhaps based on predetermined program instructions, to generate and output the live action metadata upon receiving and inputting the live action footage. The live action footage can be camera-captured data, as well as data from other sensors.

An animation creation system 730 is another part of visual content generation system 700. Animation creation system 730 might include computer processing capabilities, image processing capabilities, one or more processors, program code storage for storing program instructions executable by the one or more processors, as well as user input devices and user output devices, not all of which are shown. Animation creation system 730 might be used by animation artists, managers, and others to specify details, perhaps programmatically and/or interactively, of imagery to be generated. From user input and data from a database or other data source, indicated as a data store 732, animation creation system 730 might generate and output data representing objects (e.g., a horse, a human, a ball, a teapot, a cloud, a light source, a texture, etc.) to an object storage 734, generate and output data representing a scene into a scene description storage 736, and/or generate and output data representing animation sequences to an animation sequence storage 738.

Scene data might indicate locations of objects and other visual elements, values of their parameters, lighting, camera location, camera view plane, and other details that a rendering engine 750 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.), along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit but can be determined from a viewing frustum. In the case of imagery that is to be rendered to a rectangular view, the frustum would be a truncated pyramid. Other shapes for a rendered view are possible, and the camera view plane could be different for different shapes.

Animation creation system 730 might be interactive, allowing a user to read in animation sequences, scene descriptions, object details, etc., and edit those, possibly returning them to storage to update or replace existing data. As an example, an operator might read in objects from object storage into a baking processor 742 that would transform those objects into simpler forms and return those to object storage 734 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 732 might be used to drive object presentation. For example, if an artist is creating an animation of a spaceship passing over the surface of the Earth, instead of manually drawing or specifying a coastline, the artist might specify that animation creation system 730 is to read data from a data store 732 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2," at a lower level (e.g., "move the elbow joint 2.5 degrees per frame"), or even at a very high level (e.g., "character A should move, consistent with the laws of physics that are given for this scene, from point P1 to point P2 along a specified path").

Animation sequences in an animated scene might be specified by what happens in a live action scene. An animation driver generator 744 might read in live action metadata, such as data representing movements and positions of body parts of a live actor during a live action scene. Animation driver generator 744 might generate corresponding animation parameters to be stored in animation sequence storage 738 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 722. Animation driver generator 744 might convert that movement data into specifications of how joints of an articulated CGI character are to move over time.

A rendering engine 750 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 750 might include computer processing capabilities, image processing capabilities, one or more processors, program code storage for storing program instructions executable by the one or more processors, as well as user input devices and user output devices, not all of which are shown.

Visual content generation system 700 can also include a merging system 760 that merges live footage with animated content. The live footage might be obtained and input by reading from live action footage storage 720 to obtain live action footage; by reading from live action metadata storage 724 to obtain details, such as presumed segmentation in captured images segmenting objects in a live action scene from their background (perhaps aided by the fact that green screen 710 was part of the live action scene); and by obtaining CGI imagery from rendering engine 750.

A merging system 760 might also read data from rulesets for merging/combining storage 762. A very simple example of a rule in a ruleset might be "obtain a full image including a two-dimensional pixel array from live footage, obtain a full image including a two-dimensional pixel array from rendering engine 750, and output an image where each pixel is a corresponding pixel from rendering engine 750 when the corresponding pixel in the live footage is a specific color of green; otherwise, output a pixel value from the corresponding pixel in the live footage."

Merging system 760 might include computer processing capabilities, image processing capabilities, one or more processors, program code storage for storing program instructions executable by the one or more processors, as well as user input devices and user output devices, not all of which are shown. Merging system 760 might operate autonomously, following programming instructions, or might have a user interface or programmatic interface over which an operator can control a merging process. In some embodiments, an operator can specify parameter values to use in a merging process and/or might specify specific tweaks to be made to an output of merging system 760, such as modifying boundaries of segmented objects, inserting blurs to smooth out imperfections, or adding other effects. Based on its inputs, merging system 760 can output an image to be stored in a static image storage 770 and/or a sequence of images in the form of video to be stored in an animated/combined video storage 772.

Thus, as described, visual content generation system 700 can be used to generate video that combines live action with computer-generated animation using various components and tools, some of which are described in more detail herein. While visual content generation system 700 might be useful for such combinations, with suitable settings, it can be used for outputting entirely live action footage or entirely CGI sequences. The code may also be provided and/or carried by a transitory computer-readable medium, for example, a transmission medium such as in the form of a signal transmitted over a network.

According to one embodiment, the techniques described herein are implemented by one or more generalized computing systems programmed to perform the techniques pursuant to program instructions in firmware, memory, other storage, or a combination thereof. Special-purpose computing devices may be used, such as desktop computer systems, portable computer systems, handheld devices, networking devices, or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, such as a solid-state memory, an optical disc, or a magnetic disk, or a transient medium, such as a signal carrying the image data (e.g., a signal transmitted over a network, a digital signal, a radio frequency signal, an acoustic signal, an optical signal, or an electrical signal).

Computer System

Figure 8:
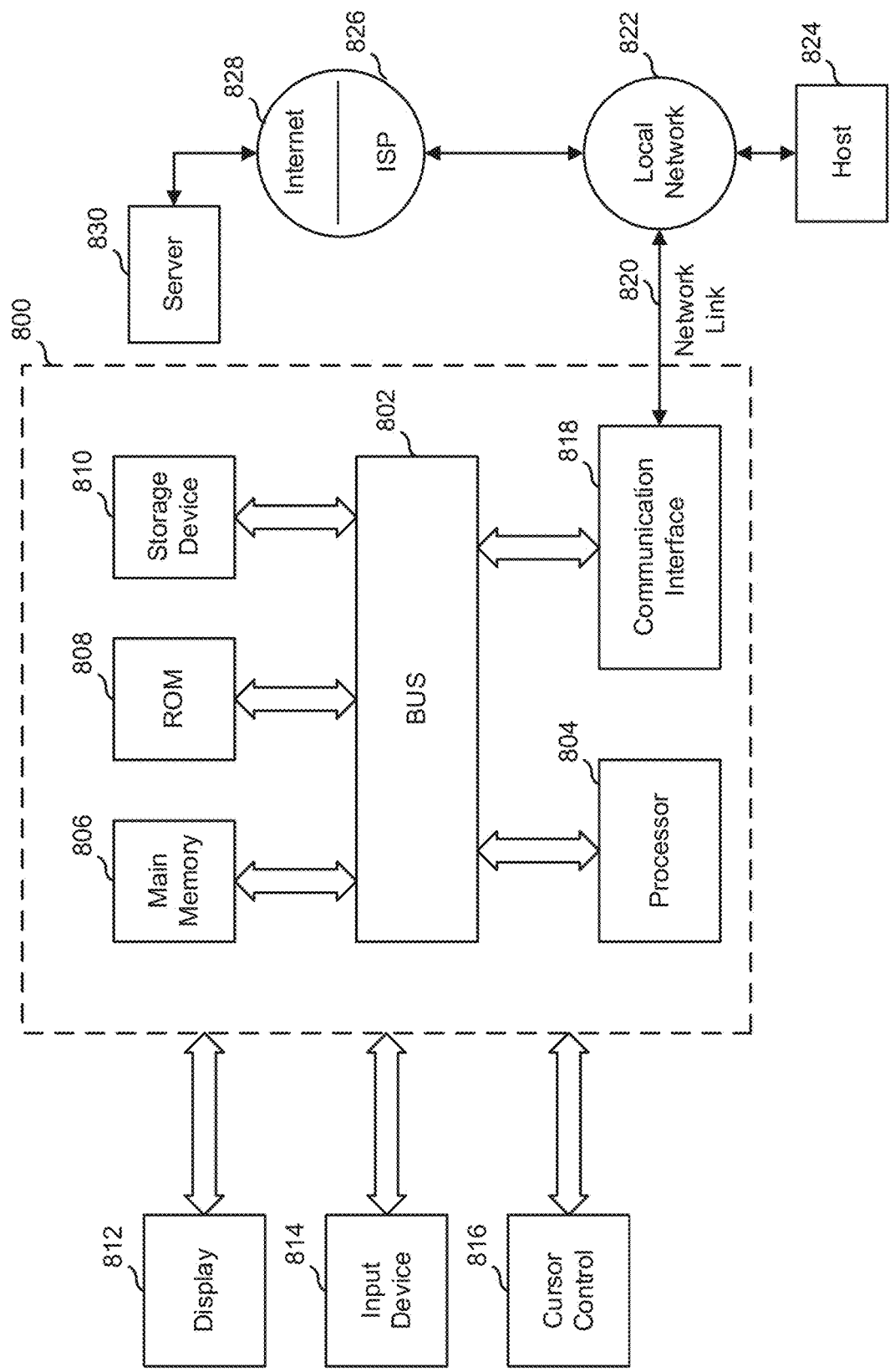
FIG. 8 is a block diagram that illustrates a computer system 800 upon which the computer systems of the systems described herein and/or visual content generation system may be implemented.

FIG. 8 is a block diagram that illustrates a computer system 800 upon which the computer systems of the systems described herein and/or visual content generation system 700 (see FIG. 7) may be implemented. Computer system 800 includes a bus 802 or other communication mechanism for communicating information, and a processor 804 coupled with bus 802 for processing information. Processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 may also be used for storing temporary variables or other intermediate information during execution of instructions to be executed by processor 804. Such instructions, when stored in non-transitory storage media accessible to processor 804, render computer system 800 a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a computer monitor, for displaying information to a computer user. An input device 814, including alphanumeric and other keys, is coupled to bus 802 for communicating information and command selections to processor 804. Another type of user input device is a cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allow the device to specify positions in a plane.

Computer system 800 may implement the techniques described herein using customized hard-wired logic, one or more ASICs or FPGAs, firmware, and/or program logic which, in combination with the computer system, causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 810. Volatile media includes dynamic memory, such as main memory 806. Common forms of storage media include, for example, a floppy disk, flexible disk, hard disk, solid state drive, magnetic tape, or any other magnetic data storage medium; a CD-ROM, any other optical data storage medium, any physical medium with patterns of holes; a RAM, a PROM, an EPROM, a FLASH-EPROM, an NVRAM, or any other memory chip or cartridge.

Storage media is distinct from, but may be used in conjunction with, transmission media. Transmission media participates in transferring information between storage media. Examples of transmission media are coaxial cables, copper wire, and fiber optics, including the wires that include bus 802. Transmission media can also take the form of acoustic or light waves, such as those generated during radio-wave and infrared data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a network connection. A modem or network interface local to computer system 800 can receive the data. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be a network card, a modem, a cable modem, or a satellite modem to provide a data communication connection to a corresponding type of telephone line or communications line. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820, and communication interface 818. In the Internet example, a server 830 might transmit a requested code for an application program through the Internet 828, ISP 826, local network 822, and communication interface 818. The received code may be executed by processor 804 as it is received, and/or stored in storage device 810, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be carried by a transitory computer-readable medium (e.g., a transmission medium such as in the form of a signal transmitted over a network).

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

The use of examples, or exemplary language (e.g., "such as") provided herein, is intended merely to better illuminate embodiments of the invention and does not pose a limitation on the scope of the invention, unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration, and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereto without departing from the broader spirit and scope of the invention as set forth in the claims, and that the invention is intended to cover all modifications and equivalents within the scope of the following claims.

All references, including publications, patent applications, and patents cited herein, are hereby incorporated by reference to the same extent as if each reference was individually and specifically indicated to be incorporated by reference and was set forth in its entirety herein.

Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. A method to calculate illumination of an elongated shape having a noncircular cross-section comprising:

representing the elongated shape having the noncircular cross-section using a nonuniform distribution of numbers mapping uniformly distributed input values to multiple sample points corresponding to multiple points on the noncircular cross-section of the elongated shape, by:
obtaining an indication of a shape of the noncircular cross-section of the elongated shape, and an orientation of the shape, wherein the noncircular cross-section of the elongated shape is an elliptical cross-section;
based on the shape of the noncircular cross-section of the elongated shape and the orientation of the shape, creating the nonuniform distribution of numbers representing the shape of the noncircular cross-section of the elongated shape,
wherein creating the nonuniform distribution of numbers includes:
representing the elongated shape having the elliptical cross-section using a Kumaraswamy distribution by:
obtaining an aspect ratio of the elliptical cross-section and the orientation of the elliptical cross-section;
based on the aspect ratio of the elliptical cross-section and the orientation of the elliptical cross-section, determining a parameter of the Kumaraswamy distribution representing the elliptical cross-section of the elongated shape;
providing an input value selected from a uniform distribution of numbers to the Kumaraswamy distribution to obtain a sample point among the multiple sample points;
applying a function to the input value to obtain an indication of a normal associated with the sample point among the multiple sample points; and
computing the illumination of the elongated shape using the normal.

2. The method of claim 1, wherein the shape of the noncircular cross-section of the elongated shape is elliptical, the method comprising:
representing the elongated shape having the elliptical cross-section using a distribution approximating a Beta distribution by:
obtaining the aspect ratio of the elliptical cross-section and the orientation of the elliptical cross-section;
based on the aspect ratio of the elliptical cross-section and the orientation of the elliptical cross-section, determining a parameter of the distribution approximating the Beta distribution representing the elliptical cross-section of the elongated shape; and
providing the input value selected from the uniform distribution of numbers to the distribution approximating the Beta distribution to obtain the sample point among the multiple sample points.

3. The method of claim 1, wherein the determining the parameter of the Kumaraswamy distribution comprises:
retrieving from a lookup table the parameter of the Kumaraswamy distribution based on the aspect ratio of the elliptical cross-section and the orientation of the elliptical cross-section.

4. The method of claim 1, wherein the nonuniform distribution of numbers comprises a Beta distribution or the Kumaraswamy distribution.

5. The method of claim 1, wherein the shape of the noncircular cross-section of the elongated shape includes a curvilinear shape.

6. The method of claim 1, wherein the function is arcsine.

7. The method of claim 1, comprising:
obtaining a second nonuniform distribution of numbers approximating the nonuniform distribution of numbers, wherein the second nonuniform distribution of numbers is more computationally efficient than the nonuniform distribution of numbers; and
using the second nonuniform distribution of numbers to calculate the normal of the elongated shape.

8. The method of claim 1, comprising:
obtaining a geometric object, including multiple elongated shapes; and
calculating illumination of the geometric object by calculating illumination of each elongated shape among the multiple elongated shapes using a nonuniform distribution of numbers corresponding to a cross-section of the each elongated shape.

9. The method of claim 1, wherein the elongated shape comprises a human hair, an animal hair, or a fiber.

10. At least one computer-readable storage medium carrying instructions, which, when executed by at least one data processor of a system, cause the system to:
obtain an indication of a shape of a noncircular cross-section of an elongated shape, and an orientation of the shape,
wherein the noncircular cross-section of the elongated shape is an elliptical cross-section;
based on the shape of the noncircular cross-section of the elongated shape and the orientation of the shape, create a nonuniform distribution of numbers mapping uniformly distributed input values to multiple points on a surface of the elongated shape,
wherein instructions to create the nonuniform distribution of numbers include instructions to:
represent the elongated shape having the elliptical cross-section using a distribution approximating a Beta distribution by:
obtaining an aspect ratio of the elliptical cross-section and the orientation of the elliptical cross-section;
based on the aspect ratio of the elliptical cross-section and the orientation of the elliptical cross-section, determining a parameter of the distribution approximating the Beta distribution representing the elliptical cross-section of the elongated shape;
provide an input value selected from a uniform distribution of numbers to the distribution approximating the Beta distribution to obtain a point among the multiple points on the surface of the elongated shape;
apply a function to the input value to obtain an indication of a normal associated with the point among the multiple points; and
compute an illumination of the elongated shape using the normal.

11. The storage medium of claim 10, wherein the shape of the noncircular cross-section of the elongated shape is elliptical, comprising the instructions to:
represent the elongated shape having the elliptical cross-section using a Kumaraswamy distribution by:
obtaining the aspect ratio of the elliptical cross-section and the orientation of the elliptical cross-section;
based on the aspect ratio of the elliptical cross-section and the orientation of the elliptical cross-section, determining a parameter of the Kumaraswamy distribution representing the elliptical cross-section of the elongated shape; and provide the input value selected from the uniform distribution of numbers to the Kumaraswamy distribution to obtain a sample point used in calculation of the normal.

12. The storage medium of claim 11, wherein the instructions to determine the parameter of the Kumaraswamy distribution comprise the instructions to:
retrieve from a lookup table the parameter of the Kumaraswamy distribution based on the aspect ratio of the elliptical cross-section and the orientation of the elliptical cross-section.

13. The storage medium of claim 10, wherein the nonuniform distribution of numbers comprises the Beta distribution or a Kumaraswamy distribution.

14. The storage medium of claim 10, wherein the shape of the noncircular cross-section of the elongated shape includes a curvilinear shape.

15. The storage medium of claim 10, wherein the function is arcsine.

16. The storage medium of claim 10, comprising the instructions to:
obtain a second nonuniform distribution of numbers approximating the nonuniform distribution of numbers, wherein the second nonuniform distribution of numbers is more computationally efficient than the nonuniform distribution of numbers; and
use the second nonuniform distribution of numbers to calculate the normal of the elongated shape.

17. The storage medium of claim 10, comprising the instructions to:
obtain a geometric object including multiple elongated shapes; and
calculate illumination of the geometric object by calculating illumination of each elongated shape among the multiple elongated shapes using a nonuniform distribution of numbers corresponding to a cross-section of the each elongated shape.

18. The storage medium of claim 10, wherein the elongated shape comprises a human hair, an animal hair, or a thread.

19. A system used to determine the illumination of an elongated shape having a noncircular cross-section, the system comprising:
at least one hardware processor; and
at least one non-transitory memory storing instructions, which, when executed by the at least one hardware processor, cause the system to:
obtain an indication of a shape of the noncircular cross-section of an elongated shape, and an orientation of the shape,
wherein the noncircular cross-section of the elongated shape is an elliptical cross-section;
based on the shape of the noncircular cross-section of the elongated shape and the orientation of the shape, create a nonuniform distribution of numbers mapping uniformly distributed input values to multiple points on a surface of the elongated shape,
wherein instructions to create the nonuniform distribution of numbers include instructions to:
represent the elongated shape having the elliptical cross-section using a distribution approximating a Beta distribution by:
obtaining an aspect ratio of the elliptical cross-section and the orientation of the elliptical cross-section;
based on the aspect ratio of the elliptical cross-section and the orientation of the elliptical cross-section, determining a parameter of the distribution approximating the Beta distribution representing the elliptical cross-section of the elongated shape;
provide an input value selected from a uniform distribution of numbers to the distribution approximating the Beta distribution to obtain a point among the multiple points on the surface of the elongated shape;
apply a function to the input value to obtain an indication of a normal associated with the point among the multiple points; and
compute an illumination of the elongated shape using the normal.

20. The system of claim 19, wherein the shape of the noncircular cross-section of the elongated shape is elliptical, comprising the instructions to:
represent the elongated shape having the elliptical cross-section using a Kumaraswamy distribution by:
obtaining the aspect ratio of the elliptical cross-section and the orientation of the elliptical cross-section;
based on the aspect ratio of the elliptical cross-section and the orientation of the elliptical cross-section, determining a parameter of the Kumaraswamy distribution representing the elliptical cross-section of the elongated shape; and
provide the input value selected from the uniform distribution of numbers to the Kumaraswamy distribution to obtain a sample point used in calculation of the normal.

21. The system of claim 20, wherein the instructions to determine the parameter of the Kumaraswamy distribution comprise the instructions to:
retrieve from a lookup table the parameter of the Kumaraswamy distribution based on the aspect ratio of the elliptical cross-section and the orientation of the elliptical cross-section.

22. The system of claim 19, wherein the nonuniform distribution of numbers comprises the Beta distribution or a Kumaraswamy distribution.

23. The system of claim 19, wherein the shape of the noncircular cross-section of the elongated shape includes a curvilinear shape.

24. The system of claim 19, wherein the function is arcsine.

25. The system of claim 19, comprising the instructions to:
obtain a second nonuniform distribution of numbers approximating the nonuniform distribution of numbers, wherein the second nonuniform distribution of numbers is more computationally efficient than the nonuniform distribution of numbers; and
use the second nonuniform distribution of numbers to calculate the normal of the elongated shape.

26. The system of claim 19, comprising the instructions to:
obtain a geometric object including multiple elongated shapes; and
calculate illumination of the geometric object by calculating illumination of each elongated shape among the multiple elongated shapes using a nonuniform distribution of numbers corresponding to a cross-section of the each elongated shape.

27. The system of claim 19, wherein the elongated shape comprises a human hair, an animal hair, or a thread.

* * * * *